United States Patent [19]

Ito et al.

[11] Patent Number: 4,991,991
[45] Date of Patent: Feb. 12, 1991

[54] JOINT STRUCTURE BETWEEN A CERAMIC SHAFT AND A METALLIC SHAFT

[75] Inventors: Masaya Ito; Shunichi Takagi; Noboru Ishida, all of Aichi, Japan

[73] Assignee: NGK Spark Co., Ltd., Aichi, Japan

[21] Appl. No.: 45,208

[22] Filed: May 4, 1987

Related U.S. Application Data

[63] Continuation of Ser. No. 783,966, Oct. 4, 1985, abandoned.

[30] Foreign Application Priority Data

Oct. 6, 1984 [JP] Japan ................................ 59-210279
Oct. 9, 1984 [JP] Japan ................................ 59-212070

[51] Int. Cl.$^5$ ........................... F16B 9/00; F01D 5/28
[52] U.S. Cl. ..................................... 403/30; 403/272; 403/273; 403/404; 416/241 B; 416/244 A
[58] Field of Search ........................... 403/404, 28–30, 403/270, 273, 272, 376, 380, 300, 221, 345, 406.1, 179; 416/241 B, 244 A

[56] References Cited

U.S. PATENT DOCUMENTS

| | | | |
|---|---|---|---|
| 934,711 | 9/1909 | Chapman | 403/272 |
| 2,100,187 | 11/1937 | Handrek | 403/30 |
| 2,867,947 | 1/1959 | Thomson et al. | 403/30 |
| 3,284,118 | 11/1966 | Kessler, Jr. | 403/29 |
| 3,302,961 | 2/1967 | Franklin | 403/272 |
| 3,443,451 | 5/1969 | Zieber, Jr. | 403/272 |
| 4,167,351 | 9/1979 | Bindin | 403/30 |
| 4,176,519 | 12/1979 | Kronogard | 416/244 A X |
| 4,281,941 | 8/1981 | Rottenkolber | 403/30 X |
| 4,424,003 | 1/1984 | Brobeck | 416/244 A |
| 4,557,704 | 12/1985 | Ito et al. | |
| 4,575,047 | 3/1986 | Boos et al. | 403/404 X |
| 4,659,245 | 4/1987 | Hirao et al. | 416/241 B X |
| 4,722,630 | 2/1988 | Fang | 403/30 |
| 4,747,722 | 5/1988 | Kawaguchi et al. | 416/241 B X |
| 4,778,345 | 10/1988 | Ito et al. | 416/241 B |

FOREIGN PATENT DOCUMENTS

| | | | |
|---|---|---|---|
| 0093606 | 6/1982 | Japan | 416/244 A |
| 0103902 | 6/1984 | Japan | 416/241 B |
| 667643 | 3/1952 | United Kingdom | 416/244 A |
| 2104171 | 3/1983 | United Kingdom | 403/300 |

*Primary Examiner*—Peter M. Cuomo
*Attorney, Agent, or Firm*—Finnegan, Henderson, Farabow, Garrett and Dunner

[57] ABSTRACT

A joint structure for joining a ceramic member to a metallic member where the two members have substantially cylindrical end portions. The end portions are place in an abutting relationship and joining member adherent to both connect the two members. A sleeve member covers the joint and is affixed at least to the surface of the end portion of the device having a composition most like the sleeve member. Where the sleeve member is metallic, the surface of the sleeve member is affixed to the metallic portion of the device.

10 Claims, 6 Drawing Sheets

JOINT STRUCTURE BETWEEN A CERAMIC SHAFT AND A METALLIC SHAFT

This application is a continuation of application Ser. No. 783,966, filed Oct. 4, 1985, now abandoned.

BACKGROUND OF THE INVENTION

The present invention relates to a means for joining a ceramic shaft with a metallic shaft, especially for use in such devices as turbochargers and gas turbine rotors.

FIGS. 1 to 4 show conventional structures for joining a metallic shaft to a ceramic shaft. In FIG. 1 the end portion of a ceramic shaft 1 has a smaller diameter than the remaining portion thereof. The end portion to be connected is inserted into the tubular end portion of a metallic shaft 2 and affixed by means of a shrink fit. In FIG. 2 the end of a metallic shaft 2 has a larger diameter than the remaining portion thereof and it is provided with a hole for receiving the end portion of a ceramic shaft 1 to be connected. The end portion of the ceramic shaft 1, is inserted into the hole and affixed by means of a shrink fit. In FIG. 3 the end portion of a ceramic shaft 1 is joined with the end portion of a metallic shaft 2 through a brazing alloy layer 3. In FIG. 4, the end portion of a ceramic shaft 1 is inserted into a hole provided at the end portion of a metallic shaft 2, similar to that depicted in FIG. 2. The end portion of the ceramic shaft 1 is joined by using a brazing alloy layer 3.

According to the conventional joint structures thus constructed, the portions of the ceramic shaft 1 and the metallic shaft 2 to be joined are heated to a high temperature to obtain the shrink fit. Therefore, the mechanical strength of the tubular portion of the metallic shaft 2, having such a thin section can result in mechanical distortion. Furthermore, the end portion of the metallic shaft may be exposed to high temperatures during use. As a result the end portion expands in the radial direction thereby eliminating the shrink fit and allowing the ceramic shaft to separate from the metallic shaft. Furthermore, in case of using the brazing alloy layer, the brazing alloy layer may be oxidized thereby reducing the strength of the connection.

SUMMARY OF THE INVENTION

Accordingly, an object of the present invention is to eliminate the above-described defects accompanying conventional joining structures. More especially, an object of the present invention is to provide a joining structure for joining a ceramic member with a metallic member. The structure comprises a metallic member having a substantially cylindrical end portion; the end portion of the metallic member having an end face. A ceramic member having a substantially cylindrical end portion with its end portion having an end face is placed such that the end face of the metallic end portion is in a substantially abutting relationship to the end face of the ceramic end portion. Joining means are adherent to the abutting end faces of the end portions with the joining means rigidly connecting the metallic member to the ceramic member. A sleeve member covers the joining means and the two end portions. The inner surface of the sleeve member is affixed with at least the surface of the end portion made of a material similar to that of the sleeve member. Preferably, the sleeve member is metallic and in such an embodiment the metallic sleeve member is affixed to the end portion of the metallic member.

DESCRIPTION OF THE PREFERRED EMBODIMENTS

The present invention will be disclosed in terms of a terms of preferred embodiments.

Figure 1:
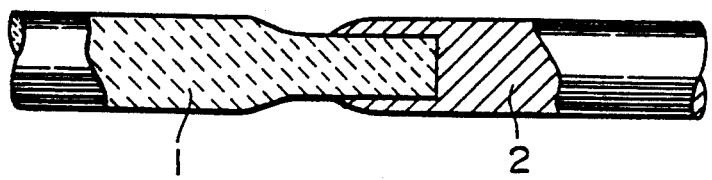
FIGS. 1 to 4 are partially sectional views of conventional joining structures.
Figure 2:
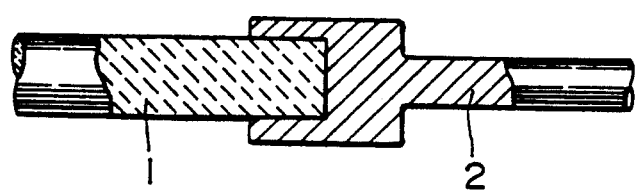
Figure 3:
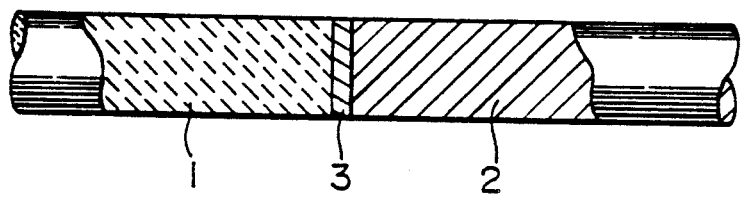
Figure 4:
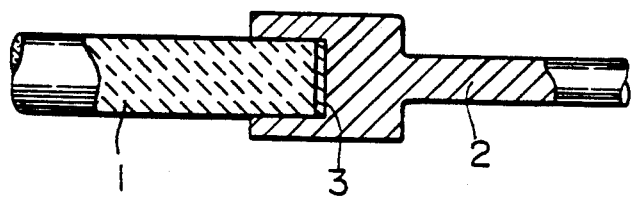
Figure 5:
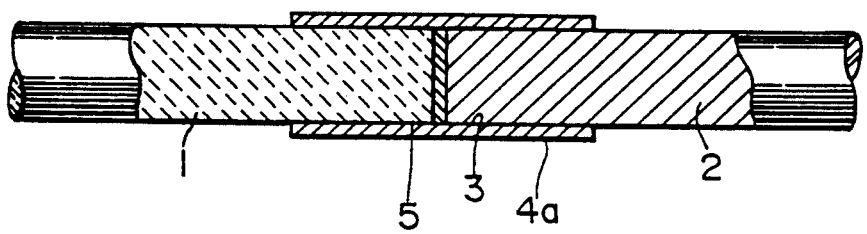
FIGS. 5 to 18 are partially sectional views of embodiments of the present invention.

Referring now to FIG. 5 an embodiment using a metallic sleeve is disclosed. The end surface of the ceramic shaft is joined with the end surface of the metallic shaft 2 with a joining member 5 such as a brazing alloy layer. Further the periphery of the metallic shaft 2 is joined with the inner surface of the metallic sleeve 4a through a brazing alloy layer 3.

The thermal expansion of the ceramic shaft 1 is different from that of the metallic shaft 2, so that there is the possibility of a crack forming at the joint portion due to residual stress developed by the heat used to form the joint. Such a crack may be avoided, however, by providing between both end surfaces of the shafts 1 and 2 a thermal shock absorbing plate such a sintered plate of ceramic material or a combination of a sintered plate and a metallic plate, as shown in Japanese Patent Application No. 59-80658, U.S. patent application Ser. No. 725,337 filed Apr. 14, 1985, the subject matter of which is incorporated by reference herein.

EXAMPLE 1

A joint structure as shown in FIG. 5 was made by using samples as shown in the following table.

TABLE I

| | | diameter | length |
|---|---|---|---|
| Ceramic Shaft | Si3N4 | 10 mm | 50 mm |
| Metallic Shaft | SUS 630 (stainless steel) | 10 mm | 50 mm |
| Metallic Sleeve | Kovar (29 Ni, 17 Co, 53 Fe, 1 minor ingredients) | inner 10.2 mm outer 14 mm | 10 mm |
| Heat Shock Absorbing Plate | Cu / Si3N4 /Cu | | |
| Brazing Alloy Layer | Eutectic Ag—Cu Brazing Alloy | 10 mm | (.3 mm thick) |
| Brazing Conditions | Effected in a furnace atmosphere of H2 at 800° C. | | |

COMPARISON 1

A convention joint structure, in which a metallic sleeve is not used, was made by using the same materials as the above Table for the purpose of comparison with the above Example.

The joint portion of both structures as heated by using a Bunsen burner with a flame temperature 1000° C. for one hour. As a result, the joint portion of the sample of the Example 1 was not changed, because the metallic sleeve protected the joint portion from oxidation. The joint portion of the conventional sample, however, was oxidized and had a rough surface.

Figure 6:
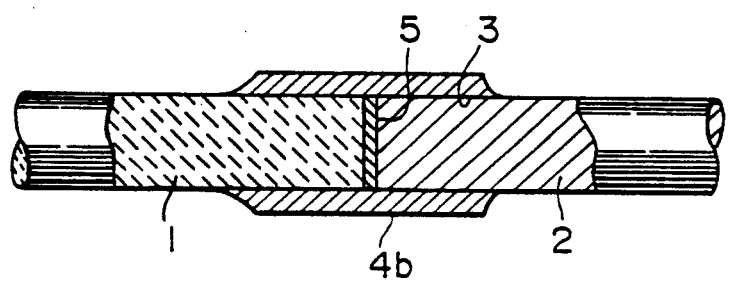
Figure 7:
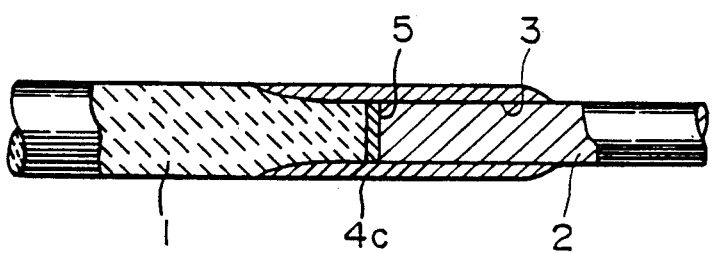

Referring to FIG. 6 a metallic sleeve 4b having a tapered end surface is shown. In FIG. 7 there is shown a metallic sleeve 4c which covers the joint portion. The outer diameter of the metallic sleeve 4c is the same as that of the major portion of the ceramic shaft 1, but the diameter of ceramic shaft 1 at the joint portion is smaller having a tapered shape down to the diameter of the metallic shaft 2 at the joint portion. In FIG. 7 the same reference numerals as are used in FIG. 5 are used for the same components.

The stress applied to the ceramic shaft in the embodiment of FIGS. 6 and 7 is smaller in comparison with the stress applied to the joint structure of FIG. 5.

FIGS. 8 to 14 disclose embodiments are particularly useful when applied to turbochargers. These embodiments relate to a joint structure in which the metallic shaft of the compressor side is joined with the ceramic shaft of a turbine rotor in a turbocharger used in connection with an internal combustion engine.

In the embodiment of FIGS. 8 to 14, number 1r denotes a projection on a ceramic turbine rotor R. A metallic shaft 2b is attached to the compressor section by means of a brazing alloy layer 3 and a joining member 5. In addition, a metal sleeve having oil sealing grooves 6 provided on its periphery is provided.

Figure 8:
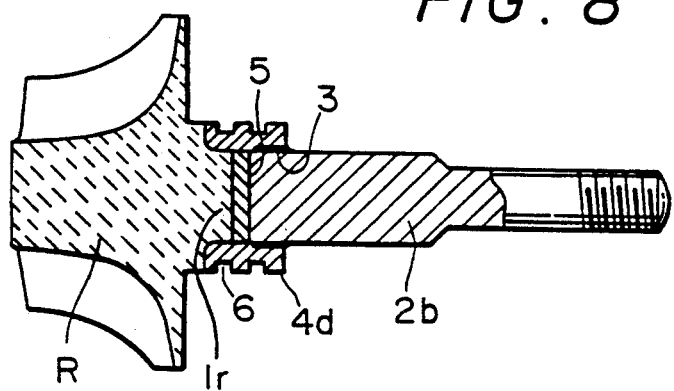
Figure 9:
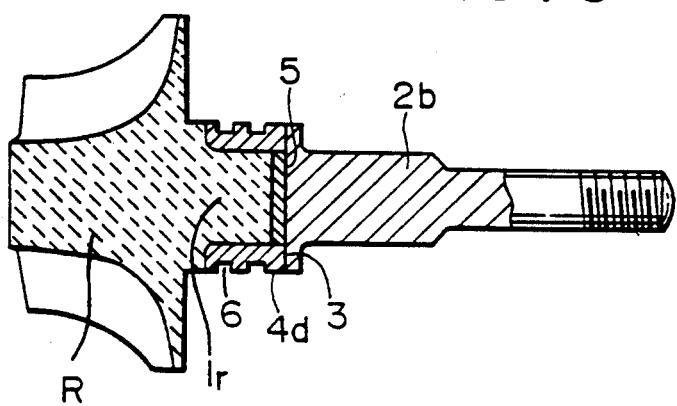

In FIG. 8 the diameter of the metallic shaft 2b is equal to that of the projection 1r, and the end surfaces of both are joined by the joining member 5. Furthermore, the joining portion is inserted into the metallic sleeve 4d and the outer surface of the metallic shaft 2b is joined by the brazing alloy layer 3 to the inner surface of the metallic sleeve 4d. In FIG. 9 the metallic sleeve 4d covers only the periphery of the projection 1r. The end surface of the metallic shaft 2b is joined to the end surface of the projection 1r and the metallic sleeve 4d by using the joining member 5.

Figure 10:
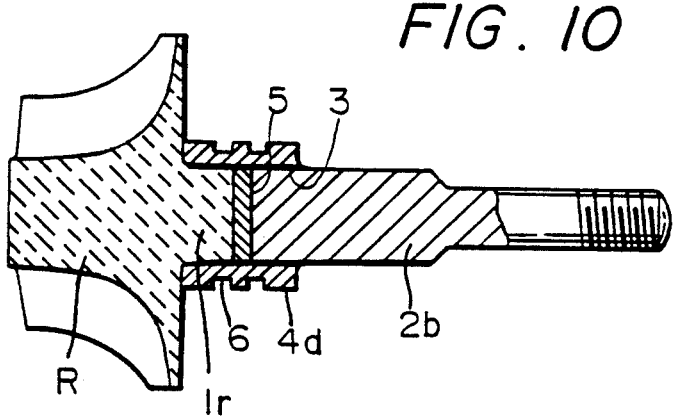

The embodiment of FIG. 10 is similar to the embodiment shown in FIG. 8. It is only different from the embodiment of FIG. 8 in that the periphery of the projection 1r is also joined to the metallic sleeve 4d with brazing alloy layer 3. This joint structure of FIG. 10 is very stable under conditions of repetitive heating and cooling.

Figure 11:
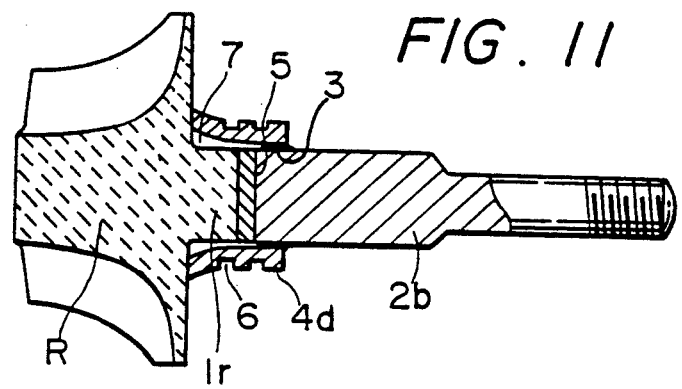

The embodiment of FIG. 11 is a modification of the embodiment of FIG. 10. In this embodiment there is provided a small gap 7 between the inner surface of the metallic sleeve 4d and the projected portion 1r as shown in FIG. 11. According to the joint structure of this embodiment of FIG. 11, cracking of the projection made of ceramic material is avoided because a clamping force due to cooling of the metallic sleeve does not affect the ceramic projection.

A number of methods may be used to assemble and join the embodiment disclosed. Brazing, welding and a shrink fit may be used for the connection between the metallic shaft and the metallic sleeve. In such methods a chemical bond is not created between the ceramic shaft and the metallic sleeve. Therefore, cracking of the ceramic material due to differential thermal contraction of the metallic sleeve is not produced.

There are three preferred methods of joining the components previously disclosed. In the first method, the metallic sleeve is joined to the metal shaft after the ceramic shaft has been joined with the metallic sleeve. In the second method the metallic sleeve is joined simultaneously with the joining operation of the ceramic shaft with the metallic shaft. In the third method, the ceramic shaft is joined after the metallic shaft is joined with the metallic sleeve. The oil sealing grooves of the metallic sleeve may be formed before or after the joining operation.

Figure 12:
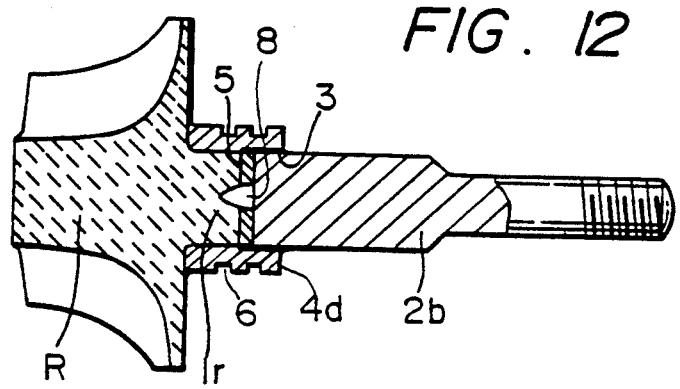

In FIG. 12 there is provided an embodiment having an adiabatic air layer 8 at the center portion of the end surface of the projection 1r and the joining member 5. In addition, the brazing alloy layer 3 is coated on the periphery of the metallic shaft 2b and the periphery of a thermal shock absorbing plate. The joint structure of the embodiment of FIG. 12 is also very stable under conditions of repetitive heating and cooling. Further, heat transmission from the projection 1r to the metallic shaft 2b is reduced by the provision of the adiabatic air layer 8.

Figure 13:
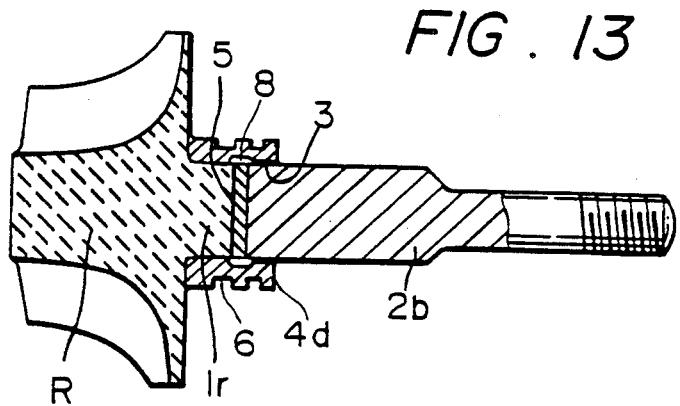

In FIG. 13 there is provided an adiabatic air layer 8' at the inner surface of the metallic sleeve 4d opposite to the periphery of the joining member 5 which is sandwiched between the end surfaces of the metallic shaft 2b and the projection 1r. The remaining portion of the embodiment of FIG. 13 is the same as that of FIG. 8.

Figure 14:
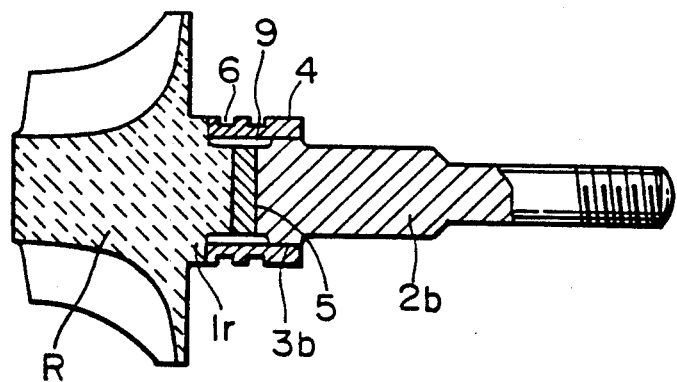

In FIG. 14, the end surface of the projection 1r of the ceramic turbine rotor R is joined to the end surface of a metallic shaft connected to the compressor section by using a joining member 5. The peripheral portion of the projection 1r, the joining member 5 and the metallic shaft 2b are cut to form a gap 9 as shown in FIG. 14. Thereafter, the metallic shaft 2b is joined to the metallic sleeve 4 having oil sealing groove 6 at the contact portion 3b by a shrink fit. The metallic sleeve 4 may be a shape memory alloy made of, for example, Ni (54–56 weight %), C (less than 0.03 weight %) and Ti (remainder). The joining is performed in such a manner that the alloy is first processed at a temperature above its $A_f$ point to produce the shape. Thereafter, the shaped part is deformed at a temperature below its $M_s$ point, and then heated again at a temperature above $A_f$. According to the joint structure of this embodiment of FIG. 14, there is very little transmission of heat between the two shafts and there is no tendency to crack the ceramic material.

Silicon nitride, silicon carbide, zirconia and boron nitride are preferable as the ceramic material. A tubular steel (JIS SKC 24), Kovar, titanium and a heat resisting steel such as carbon steel (JIS-850C), alloy steel (JIS-SCM 435), stainless steel (JIS-SUS 630), maraging steel and inconel are preferable as the metallic shaft.

Any of the above ceramic materials and metallic materials may be used as the sleeve material. It is preferred, however, to use a material for the sleeve that is high in heat resistance and has a coefficient of thermal expansion near that of the ceramic material. Furthermore, a material having a low coefficient of thermal expansion and a low Young's modulus such as tungsten, silver, zirconum and molybdenum, and a shape memory alloy are preferable.

Figure 15:
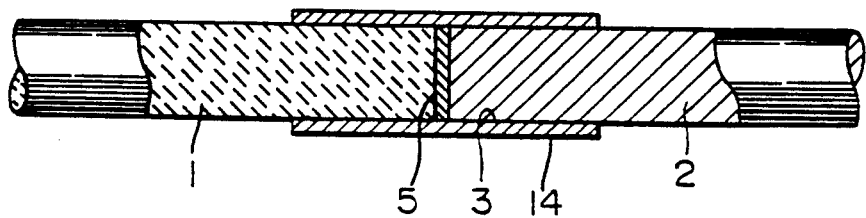

Referring to FIG. 15 an example using a ceramic sleeve is explained hereinafter. A ceramic shaft 1 is joined to a metallic shaft 2 with a ceramic sleeve 14; a joining member 5 joins the end surfaces of both shafts 1 and 2 while a brazing alloy layer 3 joins the inner surface of the ceramic sleeve with the surface of both shafts 1 and 2.

The joint structure thus constructed has the joint portion covered by the ceramic sleeve 14, so that the joint portion is not directly exposed to a high temperature and both shafts and the sleeve are easily joined by the brazing alloy layer 3. Therefore the joint strength of the joint portion is increased in comparison with a conventional joint structure having no sleeve. Furthermore, the stress retained in the ceramic shaft after the joining operation is small since the coefficient of thermal expansion of the ceramic shaft is almost equal to that of the ceramic sleeve.

It is preferable to provide a thermal shock absorbing layer mentioned above between the end surfaces of both shafts 1 and 2.

EXAMPLE 2

A joint structure as shown in FIG. 15 was made by using samples as show in the following table.

TABLE II

|  |  | diameter | length |
| --- | --- | --- | --- |
| Ceramic Shaft | $Si_3N_4$ | 10 mm | 50 mm |
| Metallic Shaft | Maraging Steel | 10 mm | 50 mm |
| Ceramic Sleeve | $Si_3N_4$ | inner 10.2 mm outer 14 mm | 10 mm |
| Heat Shock Absorbing Layer | $Ni/Si_3N_4/Ni$ | | |
| Brazing Alloy Layer | As follows | 10 mm | (.3 mm thick) |
| Brazing Conditions | As follows | | |

Brazing alloy layer was made in such a manner that the powders of titanium, silver and copper (below 250 mesh in particle size and purity above 99%) are mixed with each other in an amount of 15 weight %, 60 weight % and 25 weight % respectively. Butylcarbinol of suitable amount used as a binder, ethyl cellulose of 5 weight % and acetone are further added therein and mixed in an aluminum container using alumina balls to blend the mixture for one hour.

The paste-like brazing alloy was coated to the end surface to be joined at a thickness below 100 μm, and the brazing was conducted in a vacuum of $10^{-6}$ Torr after eliminating the binder at a predetermined temperature.

COMPARISON 2

A conventional joint structure in which a ceramic sleeve is not used was made by using the same materials as the above Table for the purpose of comparison with the Example 2.

The joint portion of both structures were heated by using Bunsen burner with a flame temperature 1000° C. for one hour. As a result, the joint portion of the sample of the Example 2 was not changed, because the ceramic sleeve protected the joint portion from the oxidation. The joint portion of the conventional sample, however, was oxidized and had a rough surface.

Figure 16:
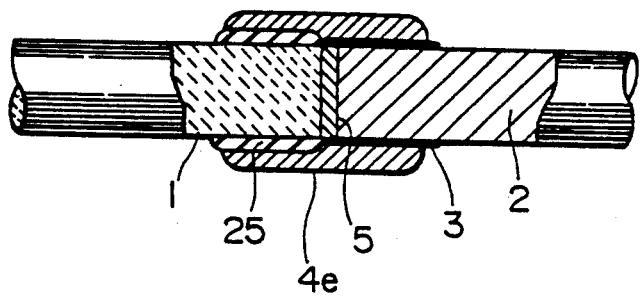

In the embodiment of FIG. 16 the end surface of the ceramic shaft 1 is joined with the end surface of the metallic shaft by using a joining member 5. The peripheral surface of the metallic shaft 2 and the joining member 5 are joined with the inner surface of a sleeve 4e by using a brazing alloy layer 3. The peripheral surface of the ceramic shaft 1 is joined with the inner surface of the sleeve 4e through a glass layer 25 having a low coefficient of thermal expansion.

The joint structure thus constructed has the joint portion covered by the sleeve, so that the joint portion is not directly exposed to a high temperature. Furthermore, the residal stress that would ordinarily be retained in the ceramic shaft after the heating associated with the joining operation is reduced by the presence of the glass layer having a low coefficient of thermal expansion.

It is preferred that the glass layer be a borosilicate glass, a suitable example of such a composition is as follows:

| Main Components | $B_2O_3$ | about 20 to 30 Weight % |
| --- | --- | --- |
|  | $SiO_2$ | about 65 to 80 weight % |
|  | $Al_2O_3$ | ⎫ |
|  | ZnO |  |
|  | MgO |  |
|  | BaO |  |
|  | $P_2O_5$ | A small quantity |
|  | $Na_2O$ |  |
|  | $K_2O$ |  |
|  | $Li_2O$ |  |
|  | $SnO_2$ |  |
|  | Other impurities | ⎭ |

Material having a coefficient of thermal expansion near to that of the ceramic material is preferable and in the case of the ceramic $Si_3N_4$ the material having a coefficient of thermal expansion of below $5 \times 10^{-6}/°C$. is desirable.

For the purpose of increasing the wetting property of the brazing alloy, it is effective to further add clay and Kaolin of 1-20 parts by weight as a binder, boron oxide of 0-50 parts by weights as a viscosity controlling agent and $Al_2O_3$, $Si_3N_4$, AlN, SiC, B-spodumene, FeB, NiB of 0-20 parts by weight as a coefficient of thermal expansion controlling material and a heat resistance increasing material.

EXAMPLE 3

A joint structure was made by using samples as shown in the following Table.

TABLE III

|  |  | diameter | length |
| --- | --- | --- | --- |
| Ceramic Shaft | $Si_3N_4$ | 10 mm | 50 mm |
| Metallic Shaft | SUS 630 | 10 mm | 50 mm |
| Sleeve | SUS 630 | inner 10.2 mm outer 14 mm | 10 mm |
| Thermal Shock Absorbing Plate | Ni/W (alloy)/NI | 10 mm | (.3 mm thick) |

A brazing alloy layer was made in such a manner that the powders of titanium, silver and copper (below 250 mesh in particle size and gaving a purity above 99%) were mixed with each other in an amount of 15 weight %, 60 weight % and 25 weight % respectively. Butylcarbinol of a suitable amount used as a binder, thyl cellulose of 5 weight % and acetone were further added therein and mixed in an aluminum container by using alumina balls to blend the mixture for one hour.

The paste-like glass forming coating is applied by using a spray method or a dipping method on the surface to be joined with the thickness of the being uniform and below 500 μm. The assembly is then heated at a temperature of from 850°-1000° C. in a nonoxidizing atmosphere where the glass coating is formed.

Then, the brazing alloy was placed with the thickness below 100 μm on the surfaces to be joined in vacuum $10^{-6}$ Torr after eliminating the binder at a predetermined termperature.

COMPARISON 3

A conventional joint structure in which a sleeve is not used was made by using the same materials as the above Table for the purpose of comparison with the Example 3.

The joint portion of both structures was heated using Bunsen burner with a flame temperature 1000° C. for one hour. As a result, the joint portion of the sample of Example 3 was not changed because the sleeve protected the joint portion from oxidation. The joint portion of the conventional sample, however, was oxidized and a rough surface was formed.

Figure 17:
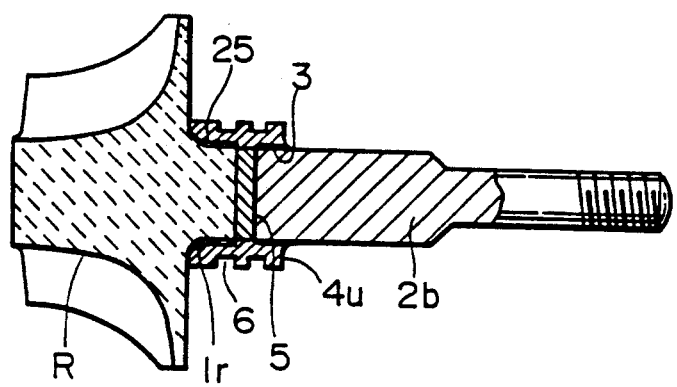

An embodiment applicable to a turbocharger is depicted in FIG. 17. In this embodiment the letter R denotes a ceramic turbine rotor, 1r is a projection from that rotor and 2b is a metallic shaft connecting the rotor to the compressor section of the device. The end surfaces of both shafts are joined by a joining member 5 and the peripheral surface of the joint portion is covered by a metallic sleeve 4u having oil sealing grooves 6 on the outer peripheral surface thereof. The inner surface of the metallic sleeve 4u is joined with the periphery of the metallic shaft 2b through the brazing alloy layer 3 and the peripheral surface of the projection 1r is joined with the inner surface of the sleeve 4u through a glass layer 25 having a low coefficient of thermal expansion.

According to the structure thus constructed, the joint portion is strengthened by the metallic sleeve 4 and is prevent from exposure to high temperatures by the sleeve 4u. Furthermore, the glass layer between the sleeve 4u and the ceramic shaft reduces the residual stress applied to the projection 1r of the ceramic shaft.

Figure 18:
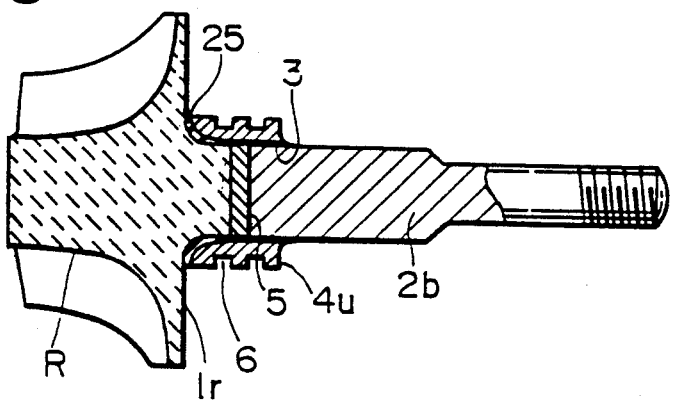

In FIG. 18, the glass layer 25 is disposed between the metallic sleeve 4u and the projection 1r with the remaining portions being the same as the embodiment of FIG. 17. The glass layer 25 is not exposed to high temperature gas, therefore the joint structure of FIG. 18 is stable under thermal cycling and during high temperature operation.

The metallic sleeve described in the above embodiment may be replaced by a ceramic sleeve to obtain similar technical effects.

As mentioned above, the present invention provides significant technical benefits. For example, oxidation of the joint portion is prevented because of the metallic or ceramic sleeve. Therefore, the strenght of the joint portion is increased. Furthermore, the metallic sleeve is light weight and easily brazed, and the stress retained in the ceramic shaft is reduced. Since there is a glass layer disposed between the sleeve and the ceramic shaft, the residual stress applied to the ceramic shaft is reduced even if the sleeve is made of a metal. Furthermore, in case of using a ceramic sleeve, the heat expansion coefficient of the ceramic shaft is near to that of the ceramic sleeve, therefore cracking of the ceramic shaft is prevented.

While the present invention has been particularly described with reference to specific embodiments thereof, it is to be understood that the words which have been used are words of description rather than limitation and that changes may be made within the purvue of the appended claims without departing from the true scope and spirit of the present invention in its broader aspects.

What is claimed is:

1. A joint structure for use in a turbocharger used in connection with an internal combustion engine, said turbocharger having a turbine section and a compressor section, said joint structure comprising:
a ceramic turbine rotor having at least one projection, said projection having an outer surface and a substantially cylindrical ceramic end face;
a metallic shaft member attached to said compressor section, said metallic shaft member having an outer surface and a substantially cylindrical metallic end face, said metallic end face of said metallic shaft member being adjacent to said ceramic end face of said projection;
means for joining the adjacent end faces of said projection and said metallic shaft member, said joining means having an outer surface and rigidly connecting said projection to said metallic shaft member; and
a separate sleeve member having an inner surface covering the outer surfaces of said projection, said metallic shaft member, and said joining means, said inner surface of said sleeve member being affixed to the outer surface of said metallic shaft member in a region proximate to the end face of said metallic shaft member.

2. The joint structure of claim 1 wherein said sleeve member is affixed to said shaft member by a shrink fit.

3. The joint structure of claim 2, wherein the sleeve member is tapered and includes a gap formed between the inner surface of the sleeve member and the outer surface of the projection, said gap being disposed to prevent cracking of the projection caused by a clamping force on the projection upon cooling of the sleeve member.

4. The joint structure of claim 3, wherein the inner surface of the sleeve member is affixed by a brazing alloy layer to the portions of the outer surfaces of said projection, said metallic shaft member, and said joining means covered by the sleeve member.

5. The joint structure of claim 1 wherein said sleeve member is affixed to said shaft member by a brazing alloy layer.

6. The joint structure of claim 1, including an air layer at a center portion of the end surface of the projection and a center portion of the joining means for reducing heat transmission from the projection to the metallic shaft member.

7. The joint structure of claim 1, including an air layer at the inner surface of the sleeve member opposite the outer surface of the joining means for reducing heat transmission from the projection to the metallic shaft member.

8. The joint structure of claim 1, including a gap between the inner surface of the sleeve member and the outer surfaces of the projection, the joining means, and the metallic shaft member for reducing heat transmission from the projection to the metallic shaft member.

9. The joint structure of claim 1, wherein the inner surface of the sleeve member is joined to the portion of the outer surface of the projection covered by sleeve member through a glass layer having a low coefficient of thermal expansion.

10. A joint structure for use in a turbocharger used in connection with an internal combustion engine, said turbocharger having a turbine section and a compressor section, said joint structure comprising:
a ceramic turbine rotor having at least one projection, said projection having an outer surface and a substantially cylindrical ceramic end face;
a metallic shaft member attached to said compressor section, said metallic shaft member having an outer surface and a substantially cylindrical metallic end face, said metallic end face of said metallic shaft member being adjacent to said ceramic end face of said projection;
means for joining the adjacent end faces of said projection and said metallic shaft member, said joining means having an outer surface and rigidly connecting said projection to said metallic shaft member; and means for protecting said joining means from oxidation, said protecting means comprising a separate sleeve member having an inner surface covering the outer surfaces of said joining means, said projection, and said metallic shaft member, said inner surface of said sleeve member being affixed to the outer surface of said metallic shaft member in a region proximate to the end face of said metallic shaft member.

* * * * *

UNITED STATES PATENT AND TRADEMARK OFFICE
CERTIFICATE OF CORRECTION

PATENT NO. : 4,991,991
DATED : February 12, 1991
INVENTOR(S) : Masao Ito et al.

It is certified that error appears in the above-identified patent and that said Letters Patent is hereby corrected as shown below:

On the title page: Assignee, change "NGK Spark Co., Ltd." to --NGK Spark Plug Co., Ltd.--;

In the Abstract, Line 4, change "place" to --placed--; and

In the Abstract, Line 4, after "joining" change "member" to --means--.

Signed and Sealed this

Twenty-seventh Day of April, 1993

*Attest:*

MICHAEL K. KIRK

*Attesting Officer*     Acting Commissioner of Patents and Trademarks